US011283636B2

(12) United States Patent
Heidemann et al.

(10) Patent No.: US 11,283,636 B2
(45) Date of Patent: Mar. 22, 2022

(54) VOLUME-BASED ONLINE CHARGING IN HYBRID NETWORKS

(71) Applicant: DEUTSCHE TELEKOM AG, Bonn (DE)

(72) Inventors: Cornelius Heidemann, Ober-Ramstadt (DE); Gerrit Voehringer, Bonn (DE); Christoph Ludwig, Neunkirchen-Seelscheid (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/547,074

(22) PCT Filed: Jan. 12, 2016

(86) PCT No.: PCT/EP2016/050435
§ 371 (c)(1),
(2) Date: Jul. 28, 2017

(87) PCT Pub. No.: WO2016/120057
PCT Pub. Date: Aug. 4, 2016

(65) Prior Publication Data
US 2018/0006832 A1 Jan. 4, 2018

(30) Foreign Application Priority Data
Jan. 29, 2015 (EP) .................... 15153058

(51) Int. Cl.
H04L 12/14 (2006.01)
H04L 12/24 (2006.01)
(Continued)

(52) U.S. Cl.
CPC ...... H04L 12/1403 (2013.01); H04L 12/1435 (2013.01); H04L 12/1467 (2013.01);
(Continued)

(58) Field of Classification Search
CPC ............. H04L 12/1403; H04L 12/1435; H04L 12/1453; H04L 41/5006; H04L 12/1467;
(Continued)

(56) References Cited

U.S. PATENT DOCUMENTS 6,615,034 B1 * 9/2003 Alloune ............... G06Q 20/102
379/121.01
2001/0040947 A1 11/2001 Daase et al.
(Continued)

FOREIGN PATENT DOCUMENTS

CN 1311603 A 9/2001
CN 1440158 A 9/2003
(Continued)

OTHER PUBLICATIONS

ETSI TS 132 296: "Digital cellular telecommunications system (Phase 2+); Universal Mobile Telecommunications System (UMTS); LTE; Telecommunication management; Charging management; Online Charging System (OCS): Applications and interfaces (3GPP TS 32.296 version 10.3.0 Release 10)", Technical Specification, pp. 1-80 (2011).

Primary Examiner — Michael Y Mapa
(74) Attorney, Agent, or Firm — Norman B. Thot

(57) ABSTRACT

A method for enabling a charging of packet switched data transfer between an authorized customer and a network. The method includes transferring a total data volume via at least a first data path and a second data path between an equipment related to the authorized customer and a hybrid access aggregation point (HAAP) as an access to the network. Each of the at least a first data path and a second data bath use a different access technology for transferring its respective part of the total data volume. The total data volume is determined as a sum of the respective parts of the total data volume transferred in both the first path and the second path.

(Continued)

The total data volume is used by a central charging unit for a charging.

11 Claims, 2 Drawing Sheets

(51) Int. Cl.
*H04M 15/00* (2006.01)
*H04L 41/5006* (2022.01)

(52) U.S. Cl.
CPC ........ *H04L 41/5006* (2013.01); *H04M 15/41* (2013.01); *H04M 15/44* (2013.01); *H04M 15/49* (2013.01); *H04M 15/55* (2013.01); *H04M 15/64* (2013.01); *H04M 15/8214* (2013.01); *H04L 12/1453* (2013.01)

(58) Field of Classification Search
CPC ...... H04M 15/44; H04M 15/64; H04M 15/55; H04M 15/49; H04M 15/8214; H04M 15/41; H04W 48/18
USPC .......................... 455/405–409, 412.2, 414.1
See application file for complete search history.

(56) References Cited

U.S. PATENT DOCUMENTS

| | | |
|---|---|---|
| 2003/0156692 A1 | 8/2003 | Ghys |
| 2008/0049781 A1* | 2/2008 | Bugenhagen ........ H04L 12/5692 370/465 |
| 2008/0062966 A1 | 3/2008 | den Hartog et al. |
| 2010/0318647 A1* | 12/2010 | Savoor .................. G06Q 50/06 709/224 |
| 2011/0010581 A1 | 1/2011 | Tanttu et al. |
| 2011/0320323 A1* | 12/2011 | Cuervo ................. H04M 15/00 705/30 |
| 2013/0310055 A1 | 11/2013 | Dewing et al. |
| 2014/0355536 A1 | 12/2014 | Muley et al. |
| 2014/0378094 A1* | 12/2014 | Gillick ................ H04M 15/765 455/406 |
| 2016/0065687 A1* | 3/2016 | Velusamy ........... H04L 67/2828 715/238 |

FOREIGN PATENT DOCUMENTS

| | | | |
|---|---|---|---|
| CN | 104285425 A | 1/2015 | |
| EP | 2 590 358 A1 | 5/2013 | |
| EP | 2728802 A1 * | 5/2014 | ......... H04L 12/2863 |
| JP | 2011-254486 A | 12/2011 | |
| JP | 2014-135607 A | 7/2014 | |
| WO | WO 2009/092852 A1 | 7/2009 | |

* cited by examiner

VOLUME-BASED ONLINE CHARGING IN HYBRID NETWORKS

CROSS REFERENCE TO PRIOR APPLICATIONS

This application is a U.S. National Phase application under 35 U.S.C. § 371 of International Application No. PCT/EP2016/050435, filed on Jan. 12, 2016 and which claims benefit to European Patent Application No. 15153058.1, filed on Jan. 29, 2015. The International Application was published in English on Aug. 4, 2016 as WO 2016/120057 A1 under PCT Article 21(2).

FIELD

The present invention relates to a method and to a system for enabling charging of packet switched data transfer between an authorized customer and a network, especially the internet or an intranet, whereby the total data volume is transferred via at least two different data paths between a customer premise equipment (CPE) and a hybrid access aggregation point (HAAP) which constitutes an access to the network, whereby each of both data paths uses a different access technologies for transferring its part of the data volume. For example, the one data path uses a DSL telephone network and the other data path a LTE mobile network.

BACKGROUND

Online charging is a technology in conventional networks which has previously been described to rate the used volume in a period for internet/intranet access. An authorized customer thereby uses his access to connect to the internet/Intranet and to send IP data packets (data) to servers in the internet/intranet or receives IP data packets from servers in the internet/intranet. For a flat-rate tariff, each amount of the transmitted data is counted and subtracted from a fixed amount defined for a certain period. If the fixed amount of data is consumed by the customer, an action occurs which is in particular a reduction of transfer speed. It is possible to implement fair use policy tariff options in mobile networks via this technology.

The mentioned technology is called "online charging" and is performed by known "online charging Systems" (OCS). The charging mechanism is standardized in ETSI TS 132 296 for mobile platforms. This mechanism for online charging is unfortunately only available for networks which use a single physical access technology.

Hybrid Access Networks (HYAs) have also previously been described which combine two or more different access technologies (for example, LTE and DSL) in an intelligent way. Hybrid Access Networks bond together at least two physical accesses to one single logical access with the goal to bring more bandwidth to the residential customer with the same behavior of one IP access (bonded bandwidth). A HYA mechanism may need to have the capability in flexibly deciding the paths to forward data traffics.

SUMMARY

An aspect of the present invention is to provide a comfortable online charging method and system which are easy to realize and to implement into existing technologies.

In an embodiment, the present invention provides a method for enabling a charging of packet switched data transfer between an authorized customer and a network. The method includes transferring a total data volume via at least a first data path and a second data path between an equipment related to the authorized customer and a hybrid access aggregation point (HAAP) as an access to the network. Each of the at least a first data path and a second data bath use a different access technology for transferring its respective part of the total data volume. The total data volume is determined as a sum of the respective parts of the total data volume transferred in both the first path and the second path. The total data volume is used by a central charging unit for a charging.

BRIEF DESCRIPTION OF THE DRAWINGS

The present invention is described in greater detail below on the basis of embodiments and of the drawings in which.

DETAILED DESCRIPTION

Figure 1:
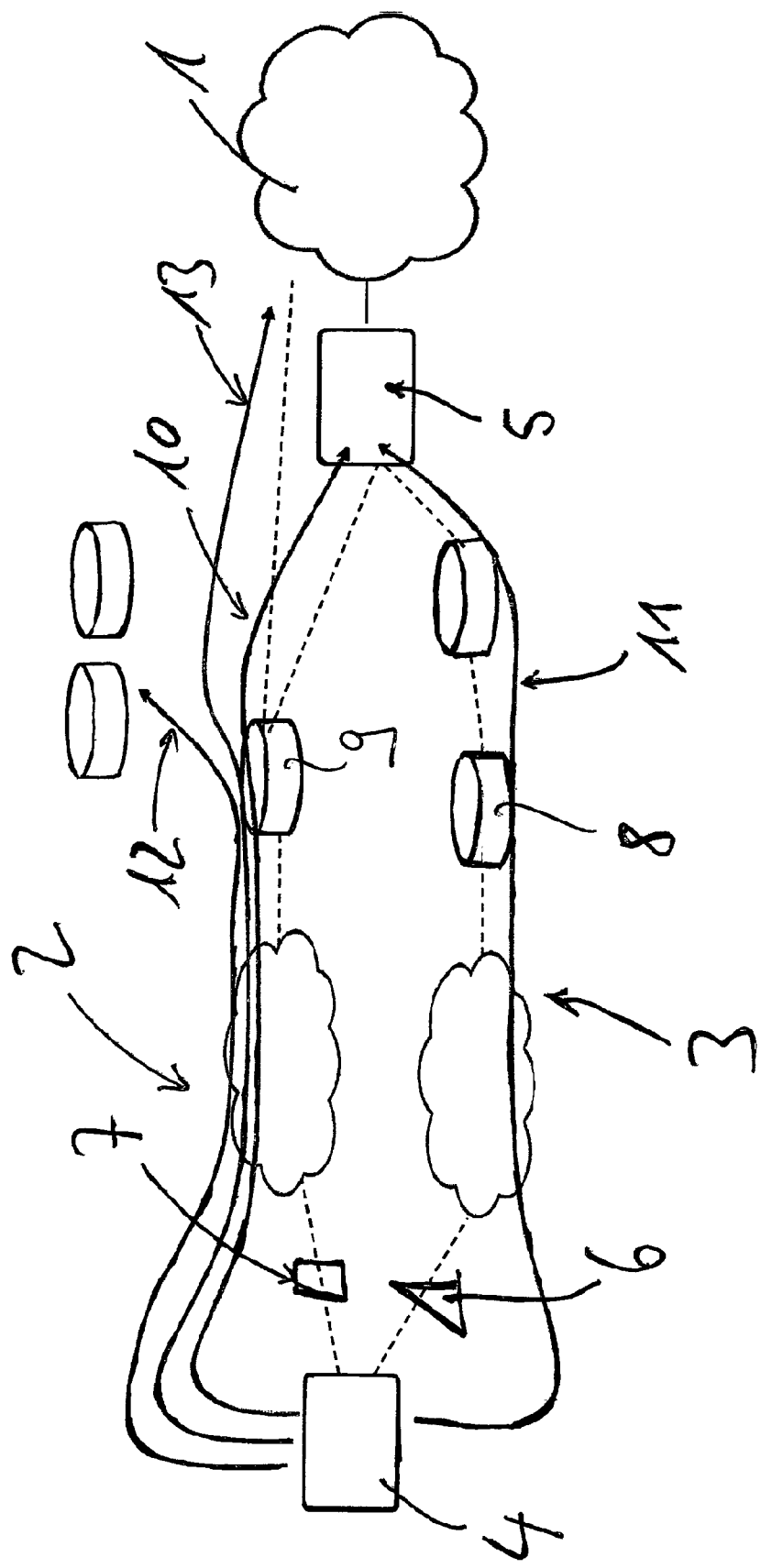
FIG. 1 shows a network topology with service creation points for counting and data flows for hybrid access.

An aspect of the present invention is to generate the total data volume as a sum of the at least both parts of data volume (these are the fractions of the total data volume which are transferred in a single path) transferred in both paths and to use this total data volume for a charging purpose at one central point which is defined by the Online Charging System (OCS).

An advantage of the present inventive solution is that it makes use of proven mechanisms which are enhanced to allow charging a combined tunnel technology, such as the mentioned hybrid access. In other words, the inventive idea is to build one common tunnel over at least two different access technologies in parallel which are necessary for hybrid access.

In an embodiment of the present invention, the passed parts of data volume can, for example, be separately determined in each single path by a respective counter unit. After determination, information about the respective part of data volume is transferred to a central charging unit, especially the online charging system (OCS), which is related to the Customer Premise Equipment (CPE). The central charging unit in this embodiment is that device which generates the sum of all single parts of data volume. The advantage of this arrangement is that the counter units still exist in each access technology and can therefore be used.

In an embodiment of the present invention, the central charging unit can, for example, be periodically provided with a fixed maximum volume of data per defined time period, whereby the fixed maximum volume builds a threshold. The central charging unit compares the resulting sum with this threshold when adding the single parts of data volume. When the sum reaches, or in the extreme, passes, the threshold, the central charging unit induces an adverse effect regarding the access facility of the customer. The central charging unit in particular induces a reduction of the transfer rate. This may happen, for example, when the customer has passed his/her internet flat rate.

In an embodiment of the present invention, the complete fixed maximum volume or flat rate can, for example, be split into a number of small volume blocks, whereby the central charging unit provides the single counter units with a sequence of these volume blocks as long as the sum of all volume blocks do not exceed the threshold defined by the fixed maximum volume. In an embodiment of the present invention, the mechanism can, for example, create different block sizes, whereby a decision mechanism calculates the next block size before assigning it to one of both service creations for hybrid access technologies.

The central charging unit may create a volume block of defined size containing an amount of data for each of both paths when realizing this mechanism. The central charging unit then assigns the volume blocks to the respective the counter units which, for example, may be realized by a fixed or a mobile network gateway (BNG, GGSN). Each volume block builds a "partly" maximum volume (a separate threshold) for the respective counter unit. Provided with such a volume block, the counter unit controls the part of data volume transported in the respective path. If this part of data volume exceeds the partly maximum volume defined by the volume block, the counter unit obtains a new volume block by the central charging unit as long as the sum of all volume blocks does not exceed the threshold defined by the fixed maximum volume.

In an embodiment of the present invention, the central charging unit can, for example, define the size of the single volume blocks in relation to the remaining total volume and/or the current conditions for data transfer in the respective path.

With this inventive mechanism, both physical accesses can be used independently of each other. Online charging must therefore keep the behavior of the underlying access in mind, that both access must be counted independently of their state of usage so that the user has the chance to use his/her paid volume and so that not too much volume is available for the user, in a worst case, the double amount.

Such a solution assigns the full volume twice when such an online charging is designed in a simple way, one volume for every access, so that enough volume is available in every situation (failure, use only one access).

The technical realization may be performed by enhancing the OCS and the mechanism for multi SIM online charging. A new connection to the fixed platform may be built which allows the OCS System to assign blocks and obtain status messages back from the service creation of the usages behavior.

To implement the inventive "intelligent online charging system for hybrid access" (fair use policy hybrid access) for an hybrid access technology, it is advantageous to design a OCS solution which is able to handle one volume over both access platforms so that the volume is counted nearly exactly independent of which access technology is used.

This may be done by calculating volume blocks as a defined part of the periodic fixed maximum volume and by assigning two blocks at the beginning of the period to the service creations (BNG and GGSN) of both access technologies. A service creation may be used as a network element which can identify the customer and account for the volume used. The block size is calculated dependent on the maximum available bandwidth (for example, narrowband access with low bandwidth and therefore small throughput) of both access technologies. A new block is assigned to one or both access if the block is consumed. The new blocks may be calculated dependent on how fast the volume was consumed and also on the above described mechanism. It may further be considered how much volume is left and how much volume was assigned to the second service creation.

The present invention will be described below in greater detail under reference to the drawings.

FIG. 1 discloses a typical network for hybrid access to the internet 1 (or an intranet) over two access networks, which in this case are a fixed DSL network 2 and a mobile LTE network 3. In FIG. 1, the physical network paths are symbolized by dashed lines and the (virtual) data paths by continuous lines. An authorized customer has hybrid access via his/her Customer Premise Equipment 4 (CPE), whereby a CPE 4 connects multiple hosts to provide connectivity to a service provider's network. For access to the mobile LTE network 2, the CPE 4 connects to an eNodeB 6, whereby the connection to the fixed DSL network 2 uses a router 7.

The CPE 4 can flexibly decide which packets of the data volume should be forwarded through the mobile LTE network 3 when the fixed DSL network 2 is heavily loaded. Each packet is associated to a single forwarding path while different packets belonging to the same flow could be transferred by different paths. Compared to flow-based solutions, the CPE 4 in a packet-based solution can therefore tune the bandwidth consumption on different paths in a flexible and fine-grained way.

The data transfer happens via the different paths between the CPE 4 and a hybrid access aggregation point (HAAP) 5 which constitutes an access to the internet 1. The HAAP 5 acts as a service termination and a service creation implements bonding mechanism and sets up a high speed internet dual stack IP connection with CPE 4 on top of two or more hybrid access technologies. The packet reorder reassemble functions in packet-based solutions should be supported on HAAP 5.

Both networks 2 and 3 include its own single counter unit defined in the respective standard documentation. In case of the mobile LTE network 3, the counter unit is a gateway GPRS support node 8, and in case of the DSL network, a broadband network gateway (BNG) 9. The data paths of the DSL network is symbolized by a tunnel fixed line 10, and the path of the LTE network is symbolized by a tunnel mobile line 11. A separate path for voice and entertainment 12 and a path for customer wishes 13 also exists.

Figure 2:
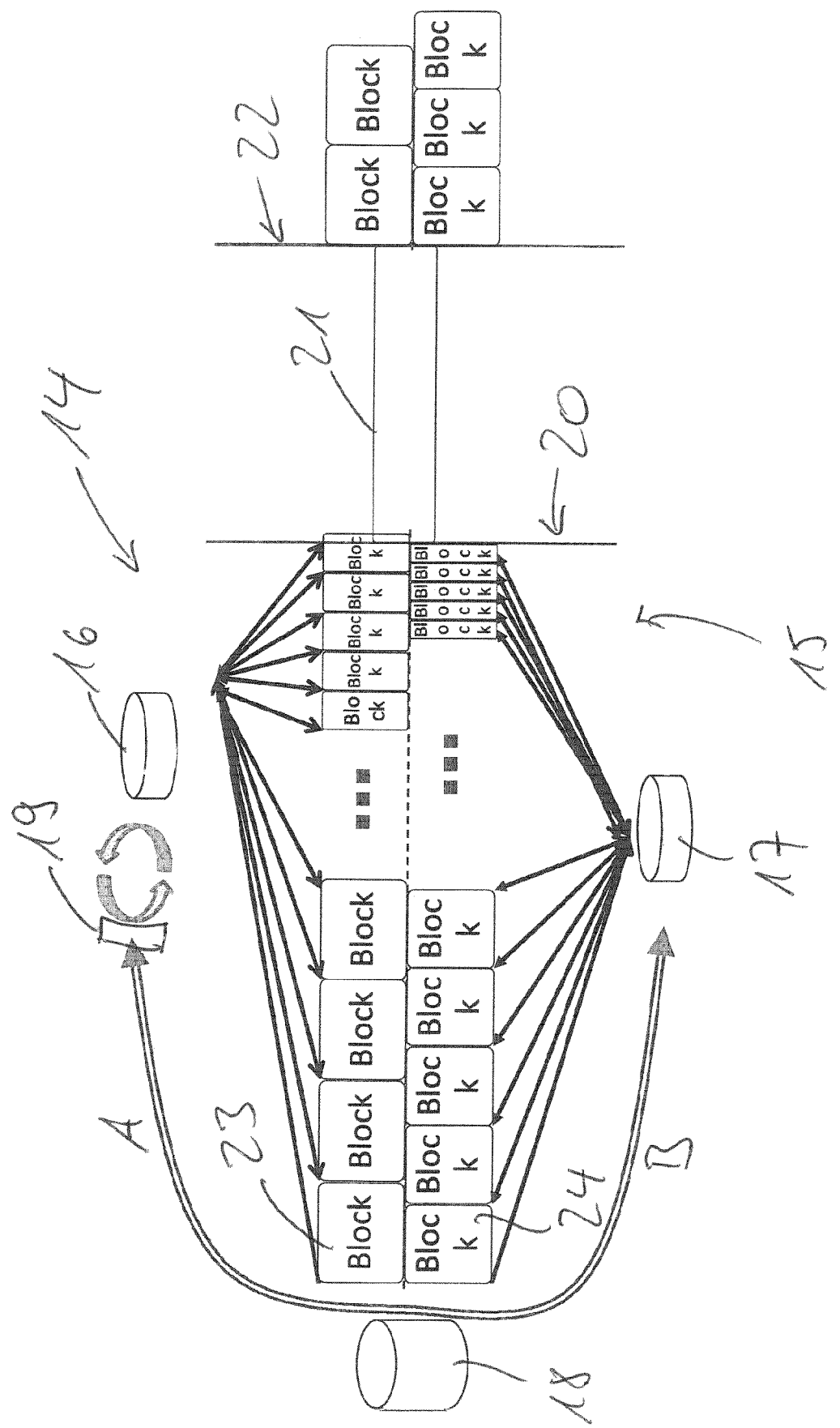
FIG. 2 shows a mechanism with intelligent block assignment.

FIG. 2 shows the mechanism with intelligent block assignment. FIG. 2 is divided into two paths, the DSL path 14 and the LTE path 15, whereby the DSL path 14 includes a BNG 16, and the LTE path 15 includes a GGSN 17. A common central charging unit (OCS) 18 in the form of an online charging system defines and provides (arrows A and B) data blocks to both the BNG 16 and the GGSN 17, whereby the BNG 16 is connected via the telephone network (FN) 19.

FIG. 2 shows the inventive mechanism of assigning single data blocks over a specific time period, whereby the OCS 18 is provided with a fixed maximum volume of data (flat rate) per defined time period. The end of the time period is reached at the moment symbolized by line 20. The customer has at that point consumed his/her complete fixed maximum volume defined by his/her flat rate. In the subsequent phase 21, the date transfer speed is reduced up to the point 22 when the next fixed amount is available.

At the beginning, OCS 18 assigns two blocks 23 and 24 to the service creations BNG and GGSN of both access technologies. Since the fixed DSL network 2 currently has the better performance, the first block 23 assigned to the fixed DSL network 2 is larger than the second block 24 assigned for the mobile LTE network 3. This is because the block size is calculated dependent on the maximum available bandwidth of both access technologies. If the particular block is consumed, a new block is assigned to one or both access. This is done as long as the sum of all blocks added and assigned by the OCS 18 is below the limit at line 20, which symbolizes the achievement of the defined maximum capacity of data volume as given by the flat rate.

The present invention is not limited to embodiments described herein; reference should be had to the appended claims.

LIST OF REFERENCE NUMERALS 1 network/internet/intranet
2 first path/fixed DSL network
3 second path/mobile LTE network)
4 Customer Premise Equipment (CPE)
5 Hybrid Access Aggregation Point (HAAP)
6 eNodeB
7 router
8 gateway GPRS support node (GGSN)
9 broadband network gateway (BNG)
10 tunnel fixed line
11 tunnel mobile line
12 path for voice and entertainment
13 path for customer wishes
14 DSL path
15 LTE path
16 BNG
17 GGSN
18 central charging unit (OCS)
19 telephone network (FN)
20 line
21 subsequent phase
22 point
23 first block
24 second block

What is claimed is:

1. A method for enabling a charging of packet switched data transfer between an authorized customer and a network, the method providing:
   transferring a total data volume via at least a first data path and a second data path between an equipment related to the authorized customer and a hybrid access aggregation point (HAAP) as an access to the internet, each of the at least a first data path and a second data path using a different access technology for transferring its respective part of the total data volume;
   determining the total data volume as a sum of the respective parts of the total data volume transferred in both the first data path and the second data path;
   using the total data volume by a central charging unit for a charging;
   separately determining the respective parts of the total data volume transferred in both the first data path and the second data path via a first data path counter unit assigned to the first data path and a second data path counter unit assigned to the second data path;
   transferring an information about the separately determined respective parts of the total data volume from each of the first data path counter unit and the second data path counter unit to the central charging unit;
   using the information transferred by the central charging unit to calculate the total data volume as a sum of the respective parts of the total data volume;
   periodically providing the central charging unit with a fixed maximum volume of data capacity per defined time period, the fixed maximum volume of data capacity per defined time period defining a threshold;
   comparing the sum with the threshold in the central charging unit so that an action can be initiated based on whether the threshold is reached or passed;
   splitting the fixed maximum volume of data capacity per defined time period into volume blocks via the central charging unit; and
   assigning the volume blocks in a sequence to the first data path counter unit or to the second data path counter unit when a sum of all assigned volume blocks do not exceed the threshold,
   wherein,
   the first data path and the second data path are physically different,
   the first data path counter unit is configured to operate in a wireless communication path,
   the second data path counter unit is configured to operate in a physical communication path,
   the equipment related to the authorized customer is a customer premise equipment (CPE), and
   each of the first data path counter unit and the second data path counter unit are arranged between the hybrid access aggregation point (HAAP) and the customer premise equipment (CPE).

2. The method as recited in claim 1, wherein the central charging unit is an Online Charging System (OCS).

3. The method as recited in claim 1, further comprising: inducing, via the central charging unit, an adverse effect of an access facility of the authorized customer.

4. The method as recited in claim 3, wherein the adverse effect is reducing a data transfer rate assigned to the authorized customer.

5. The method as recited in claim 1, further comprising:
   controlling, via the first data path counter unit or the second data path counter unit, whether data transported in its respective path exceeds a limit of the assigned volume block, and when the limit is reached or passed;
   assigning a new volume data block to a respective one of the first data path counter unit or to the second data path counter unit.

6. The method according to claim 1, further comprising:
   creating different volume block sizes via the central charging unit,
   wherein,
   a decision mechanism of the central charging unit is configured to calculate a next volume block size before assignment thereof to the first data path counter unit or to the second data path counter unit.

7. The method as recited in claim 6, wherein the next volume block size is calculated based on a momentary available maximum bandwidth of a single access technology.

8. The method as recited in claim 1, wherein,
the first data path is a wireless communication path, and the second data path is a physical communication path.

9. A system for performing the method as recited in claim 1, the system comprising:
   an equipment related to the authorized customer;
   a hybrid access aggregation point (HAAP) as an access to the internet;
   at least a first data path and a second data path which are respectively configured to transfer a part of a data volume, each of the first data path and the second data path using a different access technology for the data transfer;
   a device configured to determine a total data volume as a sum of the parts of data volume transferred via the first data path and the second data path;
   a central charging unit configured to use the total data volume for a charging; and a first data path counter unit arranged in the first data path, the first data path counter unit being configured to determine the part of data volume transferred in the first data path and to inform the central charging unit of the part of data volume so determined; and a second data path counter unit arranged in the second data path, the second data path counter unit being configured to determine the part of data volume transferred in the second data path and to inform the central charging unit of the part of data volume so determined, wherein, the first data path and the second data path are physically different, the first data path counter unit is configured to operate in a wireless communication path, the second data path counter unit is configured to operate in a physical communication path, the equipment related to the authorized customer is a customer premise equipment (CPE), and each of the first data path counter unit and the second data path counter unit are arranged between the hybrid access aggregation point (HAAP) and the customer premise equipment (CPE).

10. The system as recited in claim 9, wherein the network is the internet or an intranet, and the central charging unit is an Online Charging System (OCS).

11. The system as recited in claim 9, wherein, the first data path is a wireless communication path, and the second data path is a physical communication path.

* * * * *